United States Patent [19]

Hacker

[11] Patent Number: 4,922,976

[45] Date of Patent: May 8, 1990

[54] APPARATUS FOR REMOVING BRANCHES FROM AND FOR CROSSCUTTING TREETRUNKS

[75] Inventor: Gerold Hacker, Vienna, Austria

[73] Assignee: Steyr-Daimler-Puch AG, Vienna, Austria

[21] Appl. No.: 358,062

[22] Filed: May 26, 1989

[30] Foreign Application Priority Data

Jul. 6, 1988 [AT] Austria .................. 1749/88

[51] Int. Cl.⁵ .................. B27L 1/00; A01G 23/08
[52] U.S. Cl. .................. 144/3 D; 144/2 Z; 144/338; 144/343
[58] Field of Search ............... 144/343, 2 Z, 3 D, 338

[56] References Cited

U.S. PATENT DOCUMENTS

| 4,194,542 | 3/1980 | Eriksson | 144/2 Z |
| 4,239,067 | 12/1980 | Mononen | 144/2 Z |
| 4,515,192 | 5/1985 | Eriksson | 144/2 Z |

FOREIGN PATENT DOCUMENTS

| 2547033 | 4/1977 | Fed. Rep. of Germany | 144/2 Z |
| 2811660 | 9/1984 | Fed. Rep. of Germany | |
| 3712302 | 10/1987 | Fed. Rep. of Germany | |
| 2855430 | 12/1987 | Fed. Rep. of Germany | |
| 415161 | 8/1974 | U.S.S.R. | 144/2 Z |

Primary Examiner—W. Donald Bray
Attorney, Agent, or Firm—Marmorek, Guttman & Rubenstein

[57] ABSTRACT

The apparatus for removing branches from and for crosscutting treetrunks comprises a frame, which is adapted to be suspended from a lifting tackle and is provided with grippers for engaging the treetrunk from below, with a longitudinal feeding device for moving the treetrunk in its longitudinal direction, with branch-removing tools, which are spaced around the treetrunk, and with a crosscutting tool, which is movable transversely to the direction of the longitudinal feed movement and preferably consists of a circular saw. In order to increase in a simple manner the field of application of the crosscutting tool, the frame is provided not only with the longitudinal feeding device but also with a rotating device for a rotary feeding of the treetrunk.

12 Claims, 2 Drawing Sheets

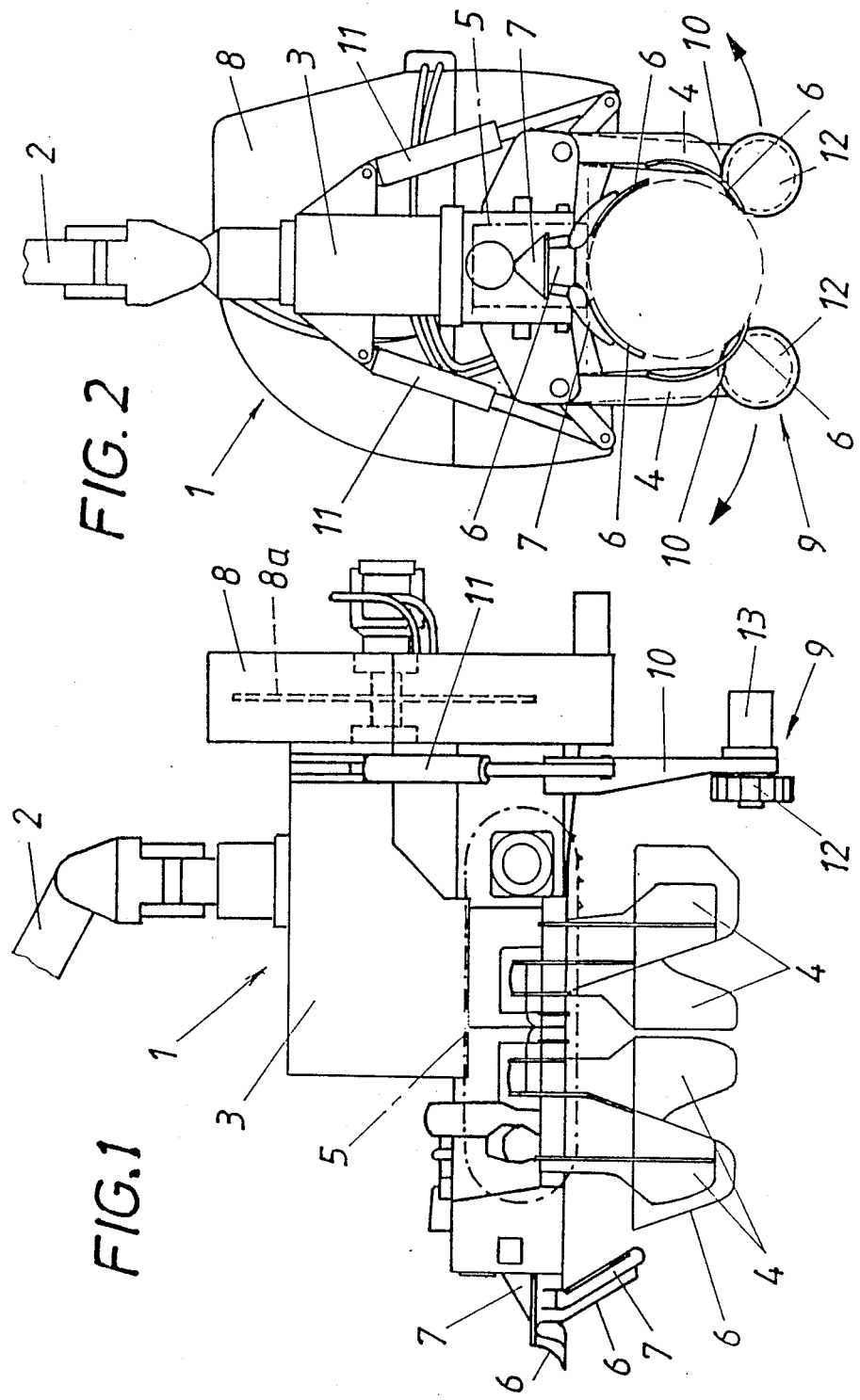

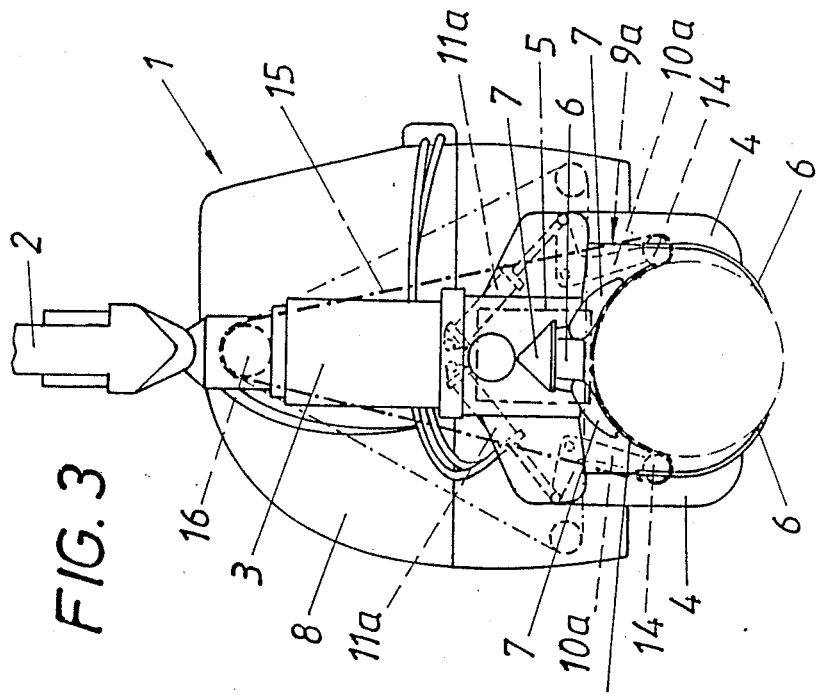
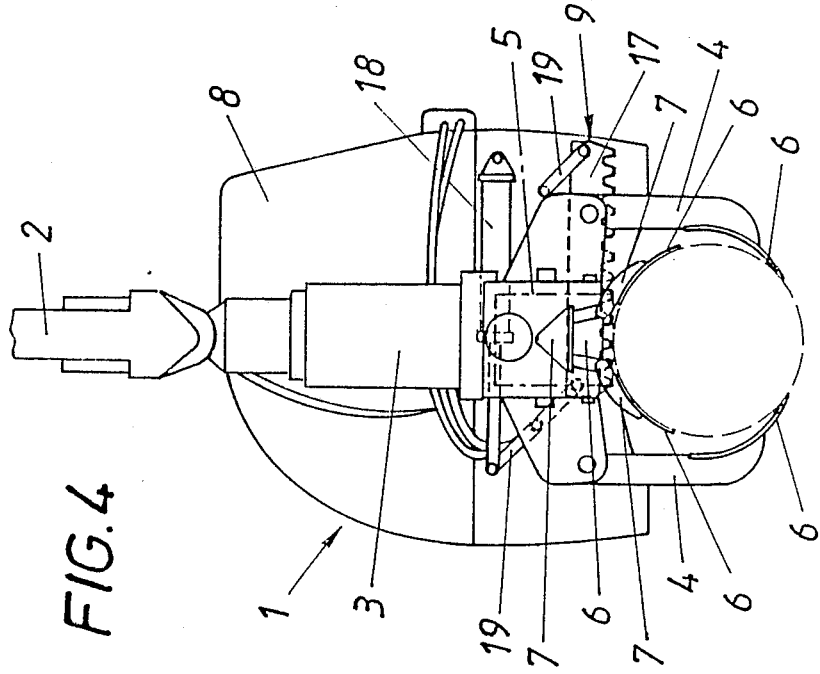

APPARATUS FOR REMOVING BRANCHES FROM AND FOR CROSSCUTTING TREETRUNKS

BACKGROUND OF THE INVENTION

1. Field of the Invention

This invention relates to an apparatus for removing branches from and for crosscutting treetrunks, which apparatus comprises a frame, which is adapted to be suspended from a lifting tackle and is provided with grippers for engaging the treetrunk from below, with a longitudinal feeding device for moving the treetrunk in its longitudinal direction, with branch-removing tools, which are spaced around the treetrunk, and with a crosscutting tool, which is movable transversely to the direction of the longitudinal feed movement and preferably consists of a circular saw.

2. Description of the Prior Art

Such apparatuses for removing branches are carried by a suitable lifting tackle, which in most cases consists of a crane that is mounted on a separate chassis. The apparatuses for removing branches can skilfully be manipulated when they are suspended from the lifting tackle. When it is desired to remove branches from the treetrunks the apparatus is lowered onto the felled tree with the grippers open. Thereafter the grippers engage the treetrunk from below and hold and guide the treetrunk for the continued processing. When the apparatus which has been coupled to the treetrunk has been lifted the feeding device moves the treetrunk in its longitudinal direction past the branch-removing knives, which face in the opposite direction and which may be secured to separate knife carriers or directly to the gripper arms. Branches are removed from the treetrunk all around its periphery as the treetrunk is pulled through the apparatus. When all branches have been removed from the treetrunk it may be cut to a desired length by a suitable crosscutting device so that felled trees can be stored in an efficient manner.

In dependence on the tool arrangement, the ranges in which the gripper can engage the treetrunk, the feeding power and, above all, the cutting conditions of the crosscutting tool, said apparatuses for removing branches and for cutting to length are designed for processing treetrunks having a certain maximum dimension, which is particularly determined by the crosscutting tool because the structural design will limit the cutting depth and the cutting range of the crosscutting tool. Whereas a circular saw owing to its fast and reliable operation is a suitable crosscutting tool, the maximum size of treetrunks to be processed will necessarily depend on the radius of the circular sawblade so that the range of use will be considerably restricted. It must also be taken onto account that most treetrunks have a larger thickness at their lower end, where they merge into the rootstock so that an efficient processing of numerous treetrunks has not been possible thus far because that base portion is oversize. This is due to the fact that a design of the branch-removing and crosscutting apparatus for an accommodation of that thicker portion would involve an intolerable additional expenditure and because apparatuses having suitable dimensions could not be used on such thicker portions. For this reason it has been necessary in practice to cut off excessively thick treetrunk sections by means of separate chain saws or by suitable handtools so that the treetrunks had to be prepared by hand for a subsequent further processing of the treetrunks by a machine. That prior manual work is complicated and difficult and involves a high labor expenditure and a high accident risk.

SUMMARY OF THE INVENTION

It is an object of the invention to eliminate the disadvantages outlined hereinbefore and to provide an apparatus which is of the kind described first hereinbefore and which has conventional overall dimensions and distinguishes in that it can be used within a wider field of application.

That object is accomplished in accordance with the invention in that the frame is provided not only with the longitudinal feeding device but also with a rotating device for a rotary feeding of the treetrunk. Owing to that rotary feeding, much more desirable cutting conditions may be obtained in an apparatus which comprises a crosscutting tool which has not been changed. For instance, the cutting range of a circular saw can almost be doubled because the rotation of the treetrunk will permit the circular saw or another cutting tool to engage the treetrunk on all sides and at any point of the periphery of the treetrunk and the treetrunk can also be cut during its rotary feeding. If a treetrunk has oversize portions it will be sufficient to operate said rotating device so that said large portions can be accommodated. No manual work will be required for a removal of branches from treetrunks having widely varying dimensions and for a crosscutting of such treetrunks to length in a fully automatic operation. This will involve only low additional costs and will substantially increase the field of use and the performance.

The turning device is suitably disposed between the crosscutting tool and the branch-removing tool do that the rotating device can engage the treetrunk at the portion from which branches have already been removed. This will not adversely affect the operation of the subsequently used crosscutting tool or the throwing-off of the logs which have been cut off.

In a particularly desirable design within the scope of the invention the turning device comprises a pair of swivel arms, which extend in a plane that is transverse to the feeding direction and are adjustable through equal and opposite angles and carry coupling means which are adapted to be driven and may consist, e.g., of coupling rollers or an entraining chain, which is trained around reversing chain sprockets. By a simple movement of the swivel arms the coupling means are movable into and out of engagement with the treetrunk and the treetrunk can be rotated if this is required or the treetrunk can be entirely released so that the longitudinal feed movement will not be obstructed. The swivel arms occupy only a small space and under the action of hydraulic cylinders can force the coupling means against the surface of the treetrunk with an adequate pressure force or may open the coupling means to such an extent that the treetrunk can be picked up and engaged without difficulty. Coupling tools of different types can be combined on the swivel arms. Coupling rollers or coupling chains are particularly suitable coupling means and can be driven without difficulty and ensure that a rotational movement will reliably be imparted to the treetrunks.

A particularly effective design will be obtained if the turning device comprises a tangential coupling bar, which is engageable with the treetrunk at its top and is reciprocable by means of a reciprocating drive. Whereas that arrangement will permit only an intermittent rotary feeding of the treetrunk, the arrangement can be mounted within a small space and involves only a low expenditure.

BRIEF DESCRIPTION OF THE DRAWING

FIG. 1 is a side elevation showing a branch-removing and crosscutting apparatus in accordance with the invention.

FIG. 2 is a front elevation showing that apparatus in operative position.

FIGS. 3 and 4 are front elevations which are similar to FIG. 2 and show two further illustrative embodiments of an apparatus in accordance with the invention.

DETAILED DESCRIPTION OF THE PREFERRED EMBODIMENTS

Illustrative embodiments of the invention will now be described more in detail with reference to the drawing.

In the embodiment shown in FIGS. 1 and 2 the branch-removing and crosscutting apparatus 1 comprises a frame 3, which is suspended from a jib 2 of a lifting tackle, such as a mobile crane, and is provided with grippers 4, which protrude downwardly from the frame 3 and are operable to frictionally engage a substantially horizontally extending treetrunk on opposite sides in the lower half of its height and to support said treetrunk. The frame 3 is also provided with a longitudinal feeding device 5 for longitudinally feeding the treetrunk. In its tree-receiving portion the frame 3 is also provided with branch-removing tools 6, which are distributed around the periphery of the treetrunk and are mounted on adjustable tool carriers 7 or directly on the grippers 4 disposed near the receiving end of the frame 3 in order to permit an adaptation of the tools 6 to treetrunks which differ in diameter. Near the delivery end of the frame 3, a circular saw 8 is provided, which constitutes a cross-cutting tool and is movable transversely to the direction of the longitudinal feed movement. The circular saw 8 can be used to cut off treetrunk portions which have a suitable length and from which the branches have been removed.

For removing branches from treetrunks and for cutting the treetrunks to length, the frame 1 with the grippers 4 open is lowered to receive each treetrunk at its receiving end. The grippers 4 are then closed to engage the treetrunk on opposite sides in the lower half of its height. When the apparatus 1 has then been lifted, the feeding device 5 consisting, e.g., of a driving chain, is started and the treetrunk is pulled in its longitudinal direction between the branch-removing tools 6. When the branches have been removed from a given portion of the treetrunk, the feeding device 5 is stopped and the portion of the treetrunk which is involved is cut off by the circular saw. Branches can then be removed from the next portion of the treetrunk and said next portion can then be cut off.

In order to extend the field of application of the circular saw 8 the frame 3 is not only provided with the feeding device 5 for feeding in the longitudinal direction but also with a rotating device 9 for a rotary feeding of the treetrunk. In the direction of the longitudinal feed movement the turning device 9 precedes the circular saw 8 and succeeds the branch-removing tools 6 and the grippers 4. That rotating device 9 is operable to rotate the treetrunk in order to cut it to length or as it is cut to length so that the treetrunk can be cut through satisfactorily and properly even when its diameter exceeds the radius of the circular sawblade 8a.

As is indicated for the illustrative embodiment shown in FIGS. 1 and 2 the turning device 9 may comprise a pair of swivel arms 10, which are adjustable through equal and opposite angles by means of hydraulic cylinders 11 and at their free ends, which extend adjacent to the lower half of the treetrunk, carry serrated coupling rollers 12. As the swivel arms 10 are swung toward each other, said coupling rollers 12 engage the treetrunk and can then be driven by roller drive means 13 to impart a rotational feed movement to the treetrunks. The swivel arms 10 can be swung apart to release the treetrunk so that the usual operation of the branch-removing tools and of the crosscutting tool can be resumed. It is apparent that the turning device 9 need to be operated only when this is required and that under normal conditions the treetrunks can be processed in the conventional manner without a rotary feed.

The illustrative embodiment shown in FIG. 3 comprise a rotating device 9a, which has swivel arms 10a provided with reversing chain sprockets 14 around which a coupling chain 15 is trained. The swivel arms 10 can be swung toward each other through equal and opposite angles by means of the hydraulic cylinders 11a so that the coupling chain 15 extending between the reversing sprockets 14 engages the upper half of the treetrunk. The chain drive 16 can then be operated to rotate the treetrunk. Again, the treetrunk can entirely be released in that the swivel arms 10a are swung apart so that the apparatus 1 can then be operated without a restraint by the turning device 9a.

In the illustrative embodiment shown in FIG. 4 the turning device 9b comprises a coupling bar 17, which has a serrated lower edge portion, which extends tangentially to the treetrunk and is engageable with the treetrunk from above. The coupling bar 17 is reciprocable by a lifting drive consisting of a hydraulic cylinder 18. For this purpose a linkage 19 is provided for supporting and guiding the coupling bar 17. The turning device 17 shown in FIG. 4 is simple, compact and robust but can be operated only to impart an intermittent rotary feed movement to the treetrunk.

I claim:

1. An apparatus for removing branches from and for crosscutting treetrunks, comprising
    a frame, which is adapted to be suspended from a lifting tackle over a treetrunk having a longitudinal axis extending in a predetermined, substantially horizontal direction,
    gripping means, which protrude downwardly from said frame and are movable mounted on said frame and operable to move into and out of frictional engagement with the lower half of said treetrunk to support the latter,
    branch-removing tools, which are mounted on said frame and distributed around the periphery of said treetrunk when it is thus supported by said gripping means,
    a longitudinal feeding device, which is mounted on said frame and operable to impart an axial feed movement to said treetrunk when it is thus supported by said gripping means,
    a crosscutting tool, which is on said frame and is operable to move transversely to said predetermined direction and to crosscut said treetrunk when it thus supported by said gripping means, and
    rotary turning means mounted on said frame for bringing an entire planar cross-section of said treetrunk into engagement with said crosscutting tool by imparting to said treetrunk when it is thus supported by said gripping means a rotary movement substantially about said axis.

2. The apparatus set forth in claim 1 wherein said crosscutting tool comprises a circular saw.

3. The apparatus set forth in claim 1 wherein all of said branchremoving tools are disposed on one side of said crosscutting tool and said longitudinal feeding device is operable to impart to said treetrunk when it is thus supported by said gripping means an axial feed movement in the direction from said branch-removing tools to said crosscutting tool, and wherein
said rotary turning means is disposed between said branch-removing tools and said crosscutting tool.

4. The apparatus set forth in claim 1 wherein
said rotary turning means comprises a pair of swivel arms extending in a plane which is transverse to said predetermined direction and carry coupling means, which means for moving said swivel arms through equal and opposite angles to move said coupling means into and out of coupling engagement with said treetrunk when it is thus supported by said gripping means, and means for driving said coupling means for imparting said rotary movement to said treetrunk.

5. The apparatus set forth in claim 4, wherein said coupling means comprise coupling rollers, which are movable into and out of engagement with said treetrunk when it is thus supported by said gripping means.

6. The apparatus set forth in claim 5, wherein said coupling rollers are serrated.

7. The apparatus set forth in claim 4, wherein
said rotary feeding means comprises at least two chain sprockets and
said coupling means comprise a coupling chain, which is trained around said chain sprockets and is movable into and out of engagement with said treetrunk when it is thus supported by said gripping means.

8. The apparatus set forth in claim 4, wherein said coupling means comprise serrated portions for engaging said treetrunk when it is thus supported by said gripping means.

9. The apparatus set forth in claim 1, wherein
said rotary turning means comprises a coupling bar, which is adapted to extend tangentially to said treetrunk and in contact therewith at the top of said treetrunk when said treetrunk is thus supported by said gripping means,
said coupling bar is reciprocable in its longitudinal direction and
a reciprocating drive is provided for reciprocating said coupling bar in its longitudinal direction.

10. The apparatus set forth in claim 8, wherein said coupling bar has a serrated lower edge portion.

11. The apparatus set forth in claim 1 wherein said rotary turning means imparts rotary movement only to said treetrunk.

12. The apparatus set forth in claim 1 wherein said rotary turning means is operative when said longitudinal feeding device is not operative.

* * * * *